United States Patent Office 2,889,327
Patented June 2, 1959

2,889,327
NEW COLOURING MATTERS

Harold Thompson Howard and Donald Graham Wilkinson, Manchester, England, assignors to Imperial Chemical Industries Limited, London, England, a corporation of Great Britain No Drawing. Application October 5, 1956
Serial No. 614,086

Claims priority, application Great Britain
October 7, 1955

8 Claims. (Cl. 260—251)

This invention relates to new colouring matters and more particularly to new colouring matters of the phthaloperinone and naphthaloperinone series and related series.

According to our invention we provide new colouring matters of the formula

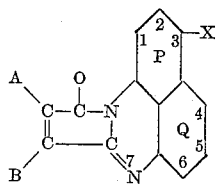

wherein A and B may be substituted or unsubstituted hydrocarbon radicals or may be joined together to form a homocyclic or heterocyclic ring system, X is an acyl radical which may be connected to the carbon atom in the 4-position to form a condensed ring system, and the nuclei P and Q may carry further substituents.

The groups A and B may be the same or different and may be substituted or unsubstituted alkyl, cycloalkyl radicals or negatively substituted aryl radicals, for example chloroaryl or nitroaryl. When A and B together form a ring system, for example a benzene ring, this may carry substituents for example halogen atoms, alkyl, or nitro groups.

The substituents in the nuclei P and Q may be for example halogen atoms.

The acyl radical X may be for example a benzoyl radical, the ortho carbon atom of which may be connected to the carbon atom in the 4-position, or a phthaloyl radical, the ortho carbonyl group of which is connected to the carbon atom in the 4-position to form for example a 3:4-phthaloyl-phthaloperinone or a 3:4-phthaloyl-naphthaloperinone.

When the acyl radical X is derived from a dicarboxylic acid other than an o-arylene dicarboxylic acid, it may be joined to the carbon atom in the 3-position of a second molecule of for example a phthaloperinone or a naphthaloperinone. As examples of dicarboxylic acid radicals which may link together two molecules of for example a phthaloperinone or a naphthaloperinone, in this way there may be mentioned aromatic radicals such as isophthaloyl-, terephthaloyl-, azobenzene-4:4'-dicarboxyl- and aliphatic radicals such as adipyl. The acid radical derived from benzene-1:2-4:5-tetracarboxylic acid (pyromellitic acid) may be linked to the carbon atoms in both the 3 and 4 positions of two molecules of a phthaloperinone or a naphthaloperinone.

The acyl radical X may carry substituents for example alkyl groups or halogen atoms.

According to a further feature of our invention we provide a process for the manufacture of new colouring matters which comprises heating a compound of the formula:

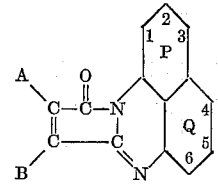

where A, B, P and Q have the meaning given above, with an anhydride or halide or a carboxylic acid in the presence of a condensing agent.

As the condensing agent there may be used for example sulphuric acid or a Friedel-Craft catalyst such as aluminium chloride, sodium aluminium chloride, potassium aluminium chloride, or mixtures thereof. The temperature required for the reaction will depend on the nature of the reagents and on the condensing agent used, but in general, temperatures between 100° C. and 200° C. are convenient in practice. The acyl compound formed may be ring-closed during the acylation step, or by subsequently heating it with a condensing agent of the kind indicated above and if desired with an oxidising agent, for example sodium m-nitrobenzene sulphonate. The use of an oxidising agent is especially valuable when the ring closure is effected by elimination of hydrogen.

The new colouring matters may be isolated by diluting the reaction mixture with water, or when a Friedel-Craft catalyst has been used preferably with dilute hydrochloric acid, and separating the product by filtration. The product may then be purified by crystallisation from a suitable solvent for example nitrobenzene, or o-dichlorobenzene. The compounds can be further substituted if desired for example by halogenation or nitration.

The new colouring matters of our invention colour plastic materials in orange, red and maroon shades of high fastness to light and stability to heat. The new colouring matters have high tinctorial strength and are especially valuable for use in colouring plastic materials which are to be moulded at high temperatures, and for colouring polymeric materials which are to be spun into fibres or made into films. They are also of value for use in lithographic varnishes and paints.

The invention is illustrated but not limited by the following examples in which the parts are by weight:

*Example 1*

108 parts of phthaloperinone and 60 parts of phthalic anhydride are mixed and ground together and the ground mixture is added gradually during 30 minutes to a stirred mixture of 600 parts of anhydrous aluminium chloride, 60 parts of sodium chloride and 80 parts of potassium chloride at 130–140° C. The reaction mixture is stirred at this temperature for a further 1 hour and then heated to 180° C. and stirred at this temperature for 1½ hours. The mixture is then added cautiously to 5000 parts of 5% hydrochloric acid and the reddish brown pigment which is precipitated is filtered off and washed free from acid. The pigment is stirred with 10,000 parts of 2% sodium carbonate solution, filtered off, washed with water until it is neutral, dried and crystallised from o-dichlorobenzene. The 3:4-phthaloylphthaloperinone is thus obtained in the form of small brown needle-shaped crystals which melt at 364–368° C., and dissolve in sulphuric acid to form a cherry-red coloured solution. It is not reduced by alkaline sodium hydrosulphite solution. When analysed the substance is found to contain 76.9% of carbon, 2.7% of hydrogen and 6.7% of nitrogen ($C_{26}H_{12}N_2O_3$ requires 78.0% of carbon, 3.0% of hydrogen and 7.0% of nitrogen). It colours cellulose acetate plastics, lithographic varnishes, paints in orange-brown shades which have very good stability to heat and light. It is valuable for use in the mass-colouration of nylon.

Example 2

In place of the 108 parts of phthaloperinone used in Example 1 there are used 128 parts of napthaloperinone. 3:4-phthaloyl-naphthaloperinone is thus obtained as a dark maroon solid, which melts at 310–340° C. When analysed the product is found to contain 80.9% of carbon, 3.1% of hydrogen, and 6.3% of nitrogen. ($C_{30}H_{14}N_2O_3$ requires 80.0% of carbon, 3.1% of hydrogen and 6.2% of nitrogen.)

Example 3

A mixture of 34 parts of 8:11-dichloro-phthaloperinone (made by condensing 3:6-dichlorophthalic anhydride with 1:8-naphthylene diamine) and 22 parts of 3:6-dichlorophthalic anhydride is added gradually during 30 minutes to a stirred mixture of 300 parts of aluminium chloride, 30 parts of sodium chloride and 40 parts of potassium chloride at 140° C. The mixture is stirred for 1 hour at 140° C., then heated to 180° C. and stirred for 1 hour at this temperature. The mixture is added to dilute hydrochloric acid and the product is isolated by the method described in Example 1 except that the product is finally crystallised from nitrobenzene. The 3:4-(3':6'-dichlorophthaloyl)-8:11-dichlorophthaloperinone is obtained in the form of small, bordeaux-coloured needle-shaped crystals which dissolve in sulphuric acid to form a dull bordeaux-coloured solution. When analysed the product is found to contain 58.5% of carbon, 1.6% of hydrogen, 25.4% of chlorine ($C_{26}H_8N_2O_3Cl_3$ requires 58.0% of carbon, 1.5% of hydrogen and 26.4% of chlorine).

Example 4

A mixture of 82 parts of 8:9:10:11-tetrachlorophthaloperinone (which may be obtained by condensing 3:4:5:6-tetrachlorophthalic anhydride with 1:8-naphthylene diamine) and 30 parts of phthalic anhydride is added gradually during 30 minutes to a mixture of 400 parts of aluminium chloride, 40 parts of sodium chloride and 53 parts of potassium chloride at 140° C. The mixture is stirred at 140° C. for 1 hour, then heated to 180° C. and stirred at this temperature for 1 hour. The mixture is added to dilute hydrochloric acid and the product is isolated as described in Example 1. 3:4-phthaloyl-8:9:10:11-tetrachlorophthaloperinone is obtained in the form of dark purple needle-shaped crystals. It colours plastics, lithographic varnishes, paints, in burgundy shades which have very good fastness properties to light and to heat treatments. It is also useful for the mass colouration of nylon.

Example 5

12 parts of phthaloperinone are added gradually to a stirred mixture of 70 parts of anhydrous aluminium chloride, 7 parts of sodium chloride and 9.3 parts of potassium chloride at 110° C. The mixture is stirred for 10 minutes and 6.7 parts of benzoyl chloride are added gradually during 15 minutes. The mixture is stirred at 110–120° C. for 2 hours and then heated to 150° C. and stirred at 150–160° C. for 5 hours. The mixture is then cautiously added to an excess of cold dilute hydrochloric acid. The solid in suspension is separated and ground. It is washed with alcohol and then with benzene, dried and crystallised from chlorobenzene, when it forms small yellow-brown crystalline leaflets. On analysis it is found to contain 7.1% of nitrogen ($C_{25}H_{14}O_2N_2$ requires 7.5% of nitrogen).

5 parts of the 3-benzoyl-phthaloperinone so formed (melting point 218–223° C.) are added gradually during 10 minutes to a well stirred mixture of 30 parts of aluminium chloride, 3 parts of sodium chloride and 4 parts of potassium chloride at 130–140° C. 5 parts of sodium m-nitrobenzene sulphonate are then added and the mixture is heated to 180° C. and stirred at this temperature for 3 hours, and finally heated to 210° C. and stirred at this temperature for 2 hours. The dark coloured reaction mixture is then decomposed with dilute hydrochloric acid and the insoluble material is filtered off, washed with hot alcohol and then with hot benzene and crystallised first from pyridine and then from nitrobenzene. The product is obtained in the form of fine maroon needle-shaped crystals which melt at 320–324° C.

Example 6

A mixture of 540 parts of phthaloperinone and 205 parts of terephthaloyl chloride is added gradually during 15 minutes to a well stirred mixture of 3000 parts of anhydrous aluminium chloride, 300 parts of sodium chloride and 400 parts of potassium chloride at 110° C. The mixture is stirred at 110–120° C. for 2 hours, heated to 150° C. and stirred at 150–160° C. for 1 hour and finally heated to 180° C. and stirred at this temperature for 3 hours. The reaction mixture is decomposed by adding it to dilute hydrochloric acid and the solid in suspension is filtered off and washed acid-free. The reddish orange powder so formed is crystallised from o-dichlorobenzene. The reddish-orange product so obtained is terephthaloyl-bis-3-phthaloperinone. If in place of phthaloperinone used in the above example an equivalent quantity of 8:11-dichlorophthaloperinone is used a pigment of somewhat redder shade is obtained.

Example 7

A mixture of 34 parts of 9:10-dichlorophthaloperinone made by condensing 4:5-dichlorophthalic anhydride with 1:8-naphthylenediamine) and 22 parts of 4:5-dichlorophthalic anhydride is added gradually during 30 minutes to a stirred mixture of 300 parts of aluminium chloride, 30 parts of sodium chloride and 40 parts of potassium chloride at 140° C. The mixture is stirred for 1 hour at 140° C., then heated to 180° C. and stirred for 1 hour at this temperature. The mixture is added to 5000 parts of 5% dilute hydrochloric acid and the pigment which is precipitated is filtered off and washed free from acid. The pigment is stirred with 10,000 parts of 2% sodium carbonate solution, filtered off, washed with water until it is neutral, dried and crystallised from nitrobenzene. The 3:4-(4':5'-dichlorophthaloyl)-8:11-dichlorophthaloperinone is obtained in the form of small bordeaux-coloured needle-shaped crystals.

Example 8

In place of the 30 parts of phthalic anhydride used in Example 4 there are used 57 parts of 3:4:5:6-tetrachlorophthalic anhydride. The 3:4 - (3':4':5':6' - tetrachlorophthaloyl)-8:9:10:11-tetrachlorophthaloperinone so obtained crystallises from nitrobenzene in the form of dark red needle-shaped crystals.

Example 9

In place of the 108 parts of phthaloperinone used in Example 1 there are used 100 parts of the perinone which is obtained by condensing 1:2-dimethylmaleic anhydride with 1:8 - naphthylene diamine. The 3:4-phthaloyl - 8:9 - dimethyl-10-keto-pyrrole (1:2:α-)perimidine so obtained is crystallised from chlorobenzene when it forms small brown needle-shaped crystals which melt at 310–315° C. When analysed the substance is found to contain 75.4% of carbon, 3.8% of hydrogen and 7.9% of nitrogen ($C_{23}H_{14}N_2O_3$ requires 76.1% of carbon, 3.7% of hydrogen and 7.4% of nitrogen).

Example 10

In place of the 108 parts of phthaloperinone used in Example 1 there are used 128 parts of the nitrophthaloperinone which is obtained by condensing 4-nitrophthalic anhydride with 1:8-naphthylene diamine. The 3:4-phthaloyl-nitrophthaloperinone so obtained is crystallised from o-dichlorobenzene when it forms small brown crystals.

Example 11

A mixture of 5.4 parts of phthaloperinone and 2.2 parts of pyromellitic anhydride is added gradually during 15 minutes to a stirred mixture of 30 parts of aluminium chloride, 3 parts of sodium chloride and 4 parts of potassium chloride at 140° C. The mixture is stirred for 1 hour at 140° C., then heated to 200° C. and stirred for 4 hours at this temperature. The mixture is added to dilute hydrochloric acid and the pigment which is precipitated is filtered off, washed free from acid, dried and crystallised from nitrobenzene. The pyromellitoyl-3':4':3":4"-bis-phthaloperinone is thus obtained in the form of small dark reddish-brown crystals.

Example 12

In place of the 5.4 parts of phthaloperinone used in Example 11 there are used 7 parts of 8:11-dichlorophthaloperinone. The 8':11':8":11"-tetrachloropyromellitoyl-3':4':3":4"-bis-phthaloperinone is obtained in the form of small reddish-brown crystals.

What we claim is:
1. Coloring matter of the formula

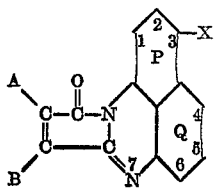

wherein A and B are selected from the group consisting of methyl and, when joined together with the —C=C— group, unsubstituted benzene and naphthalene rings and chloro- and nitro-substituted benzene and napththalene rings, X stands for a monocyclic aroyl group and the nuclei P and Q carry additional substituents selected from the group consisting of hydrogen and halogen.

2. The compound 3:4-phthaloylphthaloperinone.
3. The compound 3:4-phthaloylnaphthaloperinone.
4. The compound 3:4-(3':6'-dichlorophthaloyl)-8:11-dichlorophthaloperinone.
5. The compound 3:4-phthaloyl-8:9:10:11-tetrachlorophthaloperinone.
6. The compound terephthaloyl-bis-3-phthaloperinone.
7. The compound 3:4-(4':5'-dichlorophthaloyl)-8:11-dichlorophthaloperinone.
8. The compound 3:4 - (3':4':5':6'-tetrachlorophthaloyl)-8:9:10:11-tetrachlorophthaloperinone.

References Cited in the file of this patent

FOREIGN PATENTS 730,692    Great Britain _____ May 25, 1955

OTHER REFERENCES

Hodgson et al.: J. Chem. Soc. (London), 1945, pp. 543–5.

Fieser and Fieser: Second edition (1950), p. 577.